United States Patent [19]

d'Auria et al.

[11] 4,184,739
[45] Jan. 22, 1980

[54] BRANCHER-MIXER FOR BUNDLES OF OPTICAL FIBRES

[75] Inventors: Luigi d'Auria; André Jacques; Jacques Dubos, all of Paris, France

[73] Assignee: Thomson-CSF, Paris, France

[21] Appl. No.: 779,094

[22] Filed: Mar. 18, 1977

[30] Foreign Application Priority Data

Mar. 23, 1976 [FR] France .................. 76 08389

[51] Int. Cl.$^2$ .............................................. G02B 5/14
[52] U.S. Cl. .................... 350/96.15; 350/96.16
[58] Field of Search ............... 350/96.15, 96.16, 96.20, 350/96.22

[56] References Cited

U.S. PATENT DOCUMENTS

| | | | |
|---|---|---|---|
| 3,453,036 | 7/1969 | Swope et al. ..................... | 350/96.16 |
| 3,455,625 | 7/1969 | Brumley et al. ................... | 350/96.22 |
| 3,902,786 | 9/1975 | Brown ............................... | 350/96.16 |

FOREIGN PATENT DOCUMENTS 1369010  6/1964  France ................................ 350/96.15

*Primary Examiner*—Rolf G. Hille
*Attorney, Agent, or Firm*—Cushman, Darby & Cushman

[57] ABSTRACT

A brancher-mixer for optical fibres bundles enabling the luminous energy emanating from a transmitting bundle to be divided between two receiving bundles and essentially consisting of two monofibres laterally coupled at one of their ends to divide the luminous flux emanating from the transmitting bundle. The two monofibres are arranged in a common casing provided with mechanical connections to establish the optical connections to the three bundles of fibres.

5 Claims, 12 Drawing Figures

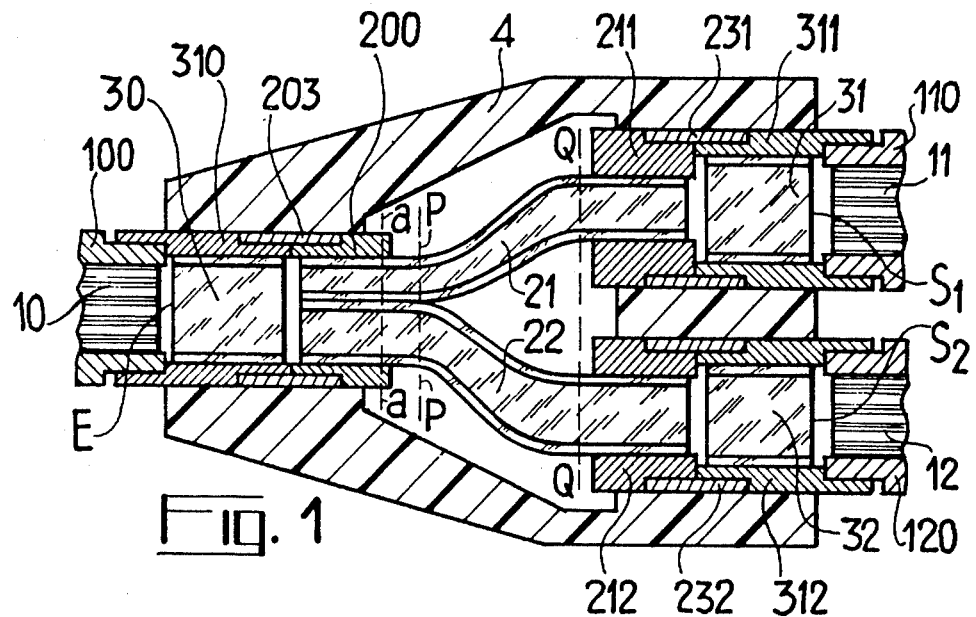
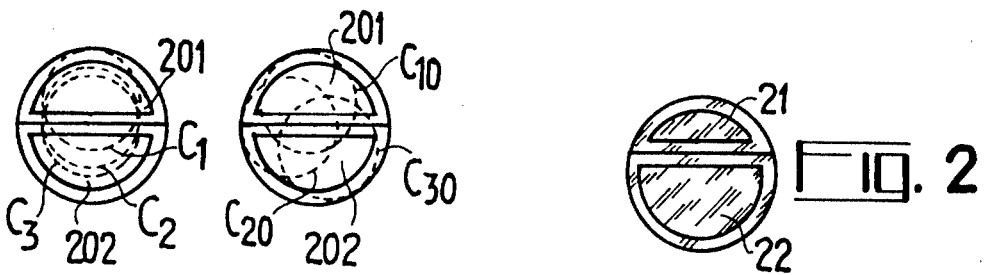
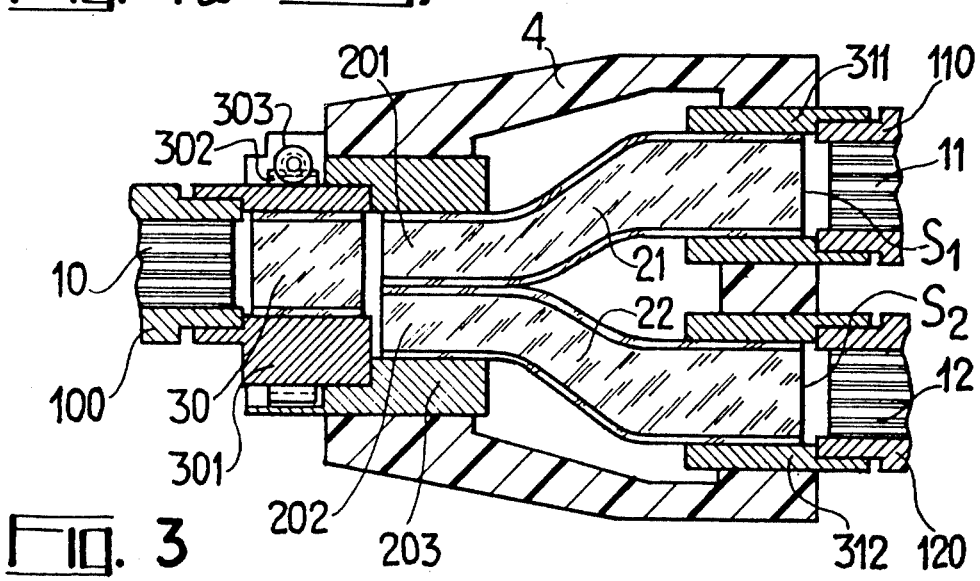

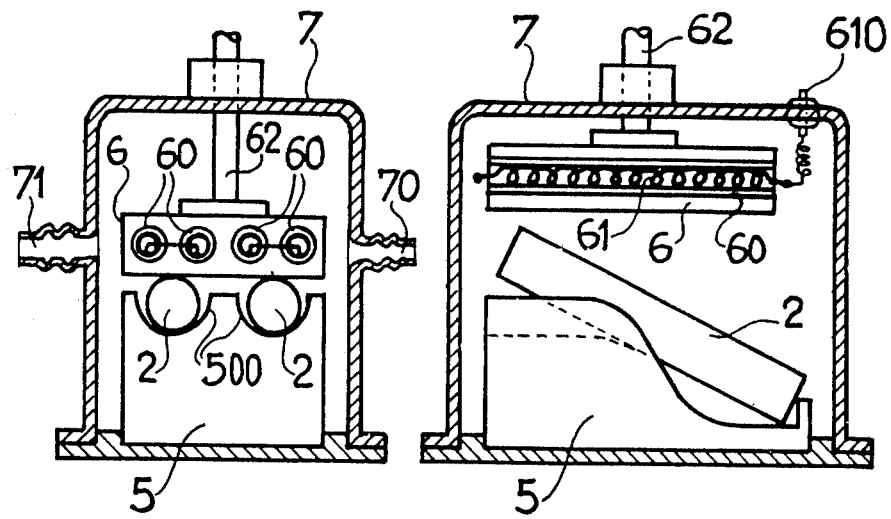
Fig. 5a   Fig. 5b
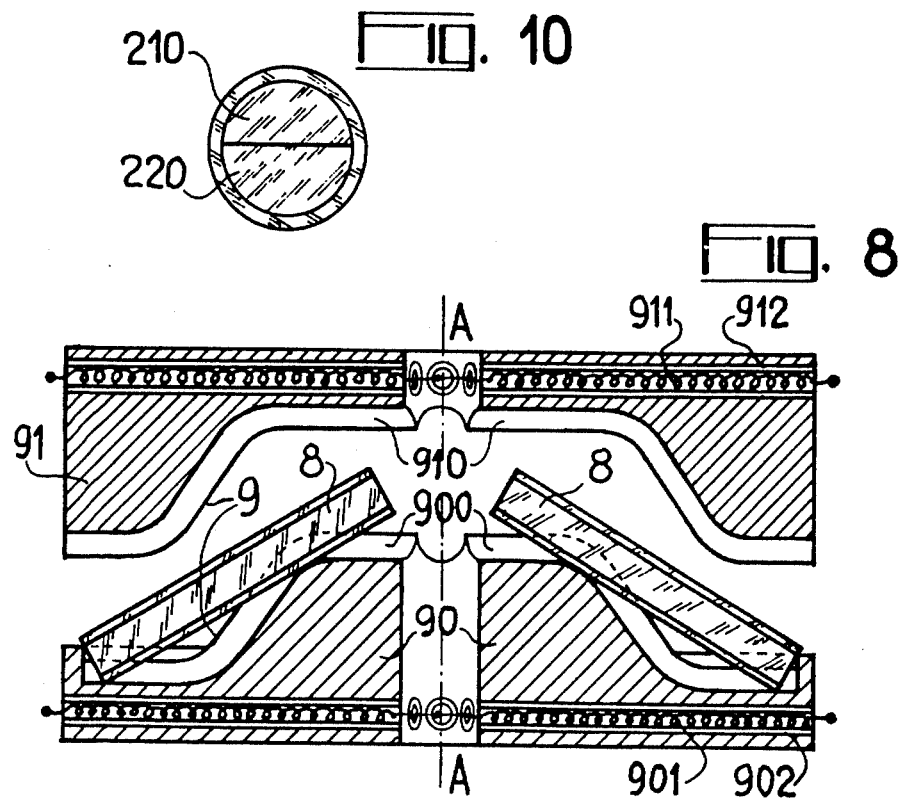
Fig. 10
Fig. 8

BRANCHER-MIXER FOR BUNDLES OF OPTICAL FIBRES

FIELD OF THE INVENTION

This invention relates to the field of connections by bundles of optical fibres. More particularly, the invention relates to a brancher-mixer intended to mix the rays emanating from the various fibres of a transmitting bundle for subsequently distributing them between two receiving bundles.

BACKGROUND OF THE INVENTION

Connections by bundles of optical fibres are intended to replace numerous transmissions of signals, commands or data at present effected by electrical cables. To allow the time-division multiplexing of exchanges of information between the central control unit and the peripheral units, it is necessary to have branching elements, or branchers, for dividing the luminous energy emanating from a transmitting bundle between two receiving bundles. Associated in cascade, branchers of this type, by successive divisions, enable the optical energy to be distributed between the various peripheral units, thus authorising a transmission structure known by the name of "busbar". Depending upon the branching configuration adopted, the brancher has to be designed to divide the radiation received into two equal or unequal parts (one quarter and three quarters or one eighth and seven eighths for example). In every case, it is required to have minimal insertion losses for limiting the attenuation of the signal transmitted. In addition, to ensure that the branching of the optical energy is unaffected by possible fibre breakages in the transmitting bundle, the luminous fluxes conveyed by the various fibres have to be carefully mixed in the brancher before the luminous energy is divided.

SUMMARY OF THE INVENTION

It is an object of the present invention to provide a brancher-mixer which satisfies the various requirements mentioned above and which, in addition, has the advantage of forming a small monolithic component which may be readily constructed at low cost.

The above object is accomplished according to the present invention by laterally coupling two single optical branching fibres over part of their length from their inlet orifice. The radiation emanating from the transmitting bundle is divided between the two orifices thus coupled and is distributed to the two receiving bundles through the separate orifices of the two monofibres.

In a first specific embodiment, the common coupling surface of the two monofibres is obtained by hot deformation of the two monofibres which thus remain provided with their cladding in the coupling region. A mixing monofibre, disposed between the orifice of the transmitting bundle and the coupled orifices of the two branching monofibres, is responsible for mixing the radiation issuing from the transmitting bundle.

In a second specific embodiment, the common coupling surface of the two branching monofibres is obtained by abrasion of the two monofibres which are thus stripped of their cladding in the coupling region. In this case, the radiation issuing from the transmitting bundle may be mixed in the region where the two branching monofibres are coupled, which enables the two coupled orifices to be disposed directly opposite the orifice of the transmitting bundle.

BRIEF DESCRIPTION OF THE DRAWINGS

This invention, together with its features, advantages and objects can be better understood from the following detailed description when read in conjunction with the accompanying drawings, wherein:

FIG. 1 shows a section through a first example of a structure according to a first embodiment of the invention.

FIG. 2 is a section through the coupling region of the two branching monofibres belonging to the structure according to the invention illustrated in FIG. 1.

FIG. 3 is a section through a second example of a structure according to a first embodiment of the invention.

FIGS. 4a and 4b show two positioning modes of the orifice of the transmitting bundle in relation to the coupled orifices of the branching monofibres belonging to the structure according to the invention as illustrated in FIG. 3.

FIGS. 5a and 5b respectively show a front and a side view of a device according to the invention for obtaining the branching monofibres used in the structures illustrated in FIGS. 1 and 3.

FIG. 8 is a section through a device according to the invention for forming the branching monofibres used in the embodiment illustrated in FIG. 6.

FIG. 10 is a section through two coupled branching monofibres according to the invention.

DESCRIPTION OF A FIRST PREFERRED EMBODIMENT

Figure 6:
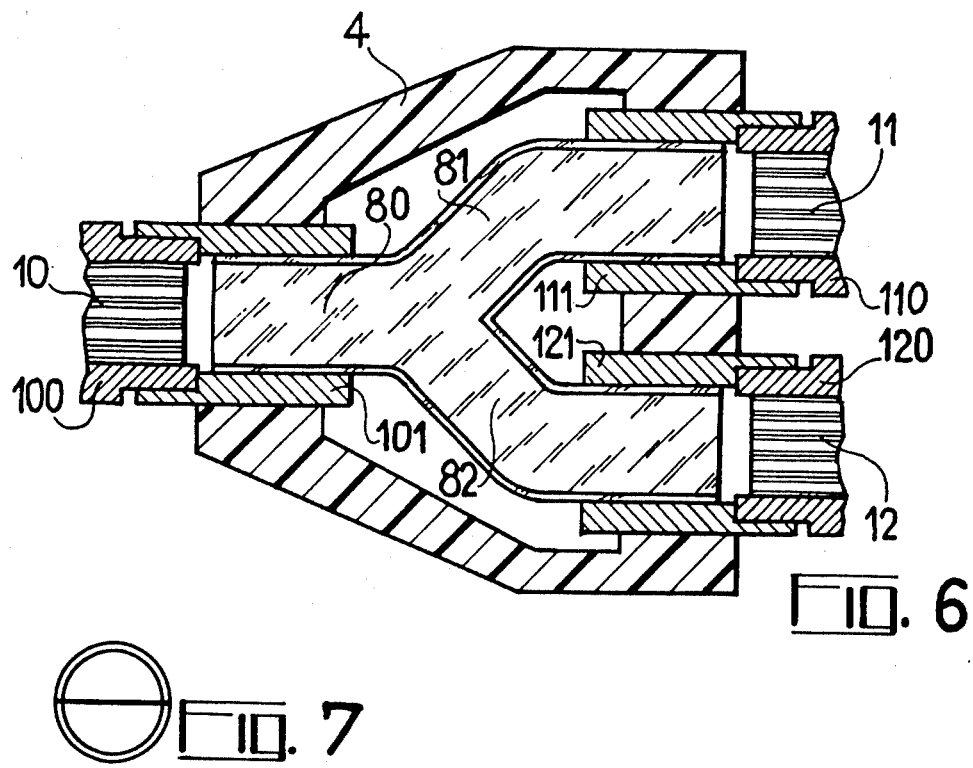
FIG. 6 is a section through a second embodiment according to the invention.

FIG. 1 is a section along a median plane of a first example of a structure according to a first embodiment of the invention. The bundles of identical optical transmitting and receiving fibres are respectively denoted by the references 10, 11 and 12. The brancher-mixer itself essentially consists of the branching monofibres 21 and 22, the connecting monofibres 30, 31 and 32 and the casing 4.

The connecting monofibres 30, 31 and 32 have a circular cross-section. The diameter of the central part, of high index, which forms the part known as the core of the monofibre, is selected equal to the diameter of the circle circumscribing the assemblage of fibres forming the transmitting and receiving bundles. They are disposed in cylindrical ferrules 310, 311 and 312, respectively, which are themselves integral with the casing 4 and of which the part directed towards the outside of the casing forms the female part of a mechanical plug-type connector. The ends of the bundles 10, 11 and 12 are themselves disposed in cylindrical ferrules 100, 110, 120 of which the end forms the male part of the connectors. The inlet orifice of the monofibre 30 is thus situated opposite the outlet orifice of the transmitting bundle 10 and forms the input E of the brancher-mixer. Similarly, the outlet orifices of the monofibres 31 and 32, disposed opposite the inlet orifices of the receiving bundles 11 and 12, constitute the outputs $S_1$ and $S_2$ of the brancher-mixer.

As shown in FIG. 1, the branching monofibres 21 and 22 are disposed between the input connecting monofibre 30 and the two output connecting monofibres 31 and 32 and are laterally coupled over part of their length from their inlet orifice opposite the monofibre 30. They have a constant cross-sectional area, although its shape varies continuously between the planes PP and QQ.

FIG. 2 is a section on the plane aa of FIG. 1 through the two branching monofibres in the coupling region. The coupled sections 21 and 22 form a circular surface with the same diameter as the connecting monofibre 30. The direct sections of the fibres 21 and 22 are therefore two complementary circular segments with respective areas $s_1$ and $s_2$ coupled by their common chord. The common coupling surface of the two monofibres is thus a planar surface.

The two coupled ends of the monofibres 21 and 22 are disposed in a cylindrical ferrule 200 which itself is kept in the extension of the ferrule 310 by the collar 203.

In the region situated between the plane QQ and their outlet orifice opposite the monofibres 31 and 32, the branching monofibres 21 and 22 both have circular cross-sections, with respective areas $s_1$ and $s_2$, so that they are smaller is diameter than the connecting monofibres 31 and 32. The cylindrical ferrules 211 and 212 coupled with the ferrules 311 and 312 by the collars 231 and 232 keep the ends of the monofibres 21 and 22 respectively in the axis of the monofibres 31 and 32.

The radiation transmitted by the fibres of the transmitting bundle 10 is received by the input E of the brancher-mixer. It is mixed and homogenised by the connecting monofibre 30 which has a uniform radiance over the entire area of its outlet orifice, and then divided between the two branching monofibres proportionately to the respective surface areas $s_1$ and $s_2$ of their coupled inlet orifices. The two connecting monofibres 311 and 312 enable the difference in diameter between the outlet orifices of the branching monofibres and the inlet orifices of the receiving bundles to be compensated, and the various fibres of the receiving bundles to be uniformly illuminated. Thus, except for the insertion losses, the receiving bundles 11 and 12 respectively receive the fractions $s_1/s_1+s_2$ and $s_2/s_1+s_2$ of the luminous energy transmitted by the transmitting bundle 10.

The structure as a whole is accomodated in a plastic casing 4 consisting of two half-shells which are symmetrical in relation to the plane of FIG. 1 and which are bonded to one another after the various elements have been placed in position.

FIG. 3 shows a second example of a structure according to the same first embodiment of the invention, again in the form of a section along a median plane.

The branching monofibres 21 and 22 again have a constant cross-sectional area of variable form but, in contrast to the example shown in FIGS. 1 and 2, are symmetrical with one another, irrespective of the ratio between the luminous fluxes which have to be received by the receiving bundles 11 and 12. The outlet orifices of these monofibres 21 and 22, which are disposed opposite the inlet orifices of the receiving bundles, are circular, their diameter being identical with that of the circle circumscribing the assemblage of fibres forming a bundle. Accordingly, there is no need for the provision of connecting monofibres and the corresponding ends of the branching monofibres are directly disposed in ferrules 311 and 312 which are integral with the casing 4 and each of which forms the female part of a plug-type connector.

FIGS. 4a and 4b are both front views of the two coupled inlet orifices of the two branching monofibres 21 and 22. The two coupled orifices 201 and 202 form a circular surface with twice the area of the outlet orifices, the two orifices being coupled along a common diameter.

In this structure, the ratio between the luminous fluxes received by the two receiving bundles is adjusted by the positioning of a connecting monofibre 30 of circular cross-section in relation to the two inlet orifices 201 and 202. To this end, in cases where the luminous flux emanating from the transmitting bundle 11 has to be divided into two unequal parts, the monofibre 30 is disposed eccentrically in a ferrule 301 which is itself fitted in the axis of a ferrule 203 in which the coupled ends of the two monofibres 21 and 22 are held. For dividing the luminous flux into two equal parts, the monofibre 30 is obviously disposed in the axis of the ferrule 301.

The ratio between the luminous fluxes may be adjusted during production of the brancher by giving a suitable value to the eccentricity of the inner cylindrical cavity formed in the ferrule 301. FIG. 4a shows in dotted lines three positions $C_1$, $C_2$ and $C_3$ of the orifice of the monofibre 30 in relation to the coupled orifices 201 and 202 of the branching monofibres 21 and 22. The position $C_1$ is a limiting position, corresponding to the maximum difference between the extraction levels permitted by the structure, which are of the order of 25% and 75%. The position $C_2$ is an intermediate position whilst position $C_3$ corresponds to an extraction level of 50% which is equal for the two receiving bundles (monofibre 30 in the axis of the ferrule 301).

The ratio between the luminous fluxes may also be adjusted by the user himself. In that case, the brancher comprises, as shown in FIG. 3, an endless screw 302 which engages in a toothed ring 303 formed on the periphery of the ferrule 301 and makes it rotate about its axis. In this case, the eccentricity of the monofibre 30 is calculated in such a way that the orifice of this fibre remains a tangent to the circle formed by the coupling of the orifices 201 and 202. FIG. 4b shows in dotted lines three positions of the orifice of the fibre 300. The position $C_{10}$ corresponds to the maximum extraction level (approximately 75%) for the orifice 201, the position $C_{30}$ corresponds to an equal extraction level (50%) for the two orifices and the position $C_{20}$ corresponds to an intermediate extraction level.

It is also possible to use the brancher shown in FIG. 3 with receiving bundles smaller or larger in diameter than the transmitting bundle. However, the diameter of the receiving bundles should be at least equal to 0.707 times the diameter of the transmitting bundle with, for this limiting value, the sole possibility of dividing the luminous flux emanating from the transmitting bundle into two equal parts.

FIGS. 5a and 5b are, respectively, a front view and a side view of the device by which it is possible to obtain branching monofibres having a cross-section of variable form and constant area from optical monofibres of circular cross-section.

The device comprises a mould 5 made of a slab of graphite. As shown in FIG. 5b, this slab has a profile which reproduces the S-shape to be imparted to the fibres. The part 50, which is also visible in FIG. 5b, is formed with a certain number of parallel grooves 500. The cross-section of these grooves is the impression of the cross-section which it is desired to impart to the monofibres for forming the coupling region.

The device additionally comprises a heating plate 6 formed by a slab of graphite traversed by quartz tubes 60 containing heating resistances 61. The plate 6 is integral through a piston 62 with a removable cover 7 which covers the mould 5. The piston 62 is responsible for the downward movement of the plate 6 for its application to the mould 5. Two small tubes 70 and 71 enable a flow of an inert gas, for example nitrogen, to be established below the cover 7. Current leads 610 are connected to the heating resistances 61.

Monofibres of circular cross-section are used, the surface area of this cross-section being equal to the cross-sectional area of the grooves 500. After cutting to the requisite length, the monofibres 2 are placed in the grooves 500, as indicated in FIG. 5b. The cover is then placed in position and purged with nitrogen to prevent the graphite from being oxidised during the subsequent heating operation. The heating plate is placed under voltage and heated to its operating temperature which is such as to enable the constituent glass of the fibres to soften. This temperature is of the order of 600° C. By means of the piston 62, the plate 6 is carefully lowered and wedges the upper end of the fibres in the grooves 500, as shown in FIG. 5a. The fibres in contact with the heating plate soften and, under the influence of the forces of gravity, deform to follow the S-profile of the mould 5. The plate 6 is then pressed onto the mould 5 to force the fibre to assume the shape of the groove. In this way, there are obtained as many monofibres ready to be fitted into the brancher as there are grooves 500 in the mould 5.

DESCRIPTION OF A SECOND PREFERRED EMBODIMENT

FIG. 6 shows a brancher-mixer according to a second embodiment of the invention. As shown in this FIG. 6, which is a section taken along a median plane of the brancher, this structure consists of two branching monofibres 81 and 82 laterally coupling over part of their length to form the mixing zone 80, and of three ferrules 101, 111 and 121 which keep the ends of these branching monofibres integral with a casing 4.

The transmitting bundle and the two receiving bundles, which are identical and which are respectively denoted by the references 10, 11 and 12, have their ends fitted with cylindrical ferrules 100, 110 and 120 which form the male parts of detachable connections. These ferrules 100, 110 and 120 engage respectively in the ferrules 101, 111 and 121 which form the female parts of these same connections.

Apart from in the mixing zone 80 where they are coupled, the two branching monofibres 81 and 82 each have a circular cross-section and the diameter of the core is selected equal to the diameter of the circle circumscribing the assemblage of fibres forming the transmitting or receiving bundles.

In the coupling region, the two monofibres are both divided along a diametral plane and are coupled along that plane.

Figure 7:
FIG. 7 shows the common orifice of the two coupled branching monofibres belonging to the embodiment illustrated in FIG. 6.

FIG. 7 shows the common circular orifice of the two half-monofibres coupled in the mixing zone 80. This orifice has by design a core diameter equal to that of the transmitting bundle. Comparison of FIG. 7 with FIGS. 2 or 4a and 4b shows that there is a considerable difference between this second embodiment of the invention and the first embodiment initially described in the fact that the cladding is removed at the coupling interface.

In order to obtain as perfect an optical contact as possible at the interface of the two half-monofibres in the region 80 and thus to obtain a region where the rays issuing from the various fibres of the transmitting bundle 10 are mixed as perfectly as possible, the invention proposes two solutions.

The first solution consists in introducing, between the two coupling planes, a sealing compound with a refractive index higher than that of the constituent material of the cladding and lower than that of the constituent material of the core of the coupled monofibres.

The mixing function will be performed more effectively by the zone 80, the closer the refractive index of the sealing compound to that of the core of the monofibres. For example, good results may be obtained with monofibres of which the indices of core and cladding are, respectively, 1.620 and 1.512, using as sealing compound an epoxy resin of the type known under the Registered Trade Mark "Araldite" of optical quality and with a refractive index of 1.55.

A second solution consists in welding the two half-monofibres in a flame. A single monofibre is thus reconstituted in the zone 80.

As in the first embodiment, the casing is formed by two half-shells which are symmetrical in relation to the plane of FIG. 6 and which are bonded after insertion of the monofibres.

This second embodiment has the advantage over the first embodiment of being extremely easy to construct because it eliminates the need for the connecting monofibres. However, it may only be used when the extraction levels of the two receiving bundles have to be equal.

FIG. 8 is a section through a device for simultaneously forming a certain number of branching monofibres suitable for use in the second embodiment of the brancher-mixer. The device as a whole has symmetry of revolution about the axis AA. It consists of two, male and female heating moulds 90 and 91 of graphite. n grooves 900 and 910 are formed in the profiles 9 which are intended to come into contact and which reproduce the profile to be imparted to the monofibres, these grooves 900 and 910 being disposed radially according to a symmetry of order n relative to the axis A. The cross-section of these grooves is in the form of a semicircle with the same radius as the cross-section of the monofibres. Heating resistances 901 and 911, accomodated in insulating tubes 902, 912, enable the two parts to be heated to temperatures of the order of 600° C.

The monofibres to be formed, cut to the required length, are disposed in the grooves, as shown in FIG. 8. The whole is then covered by a cover and placed under a non-oxidising atmosphere. The heating resistances of the two moulds 90 and 91 are placed under voltage until the monofibres soften. A mechanism (not shown in FIG. 8) then enables the mould 91 to be pressed onto the mould 90. The monofibres are released from the mould after cooling.

Figure 9:
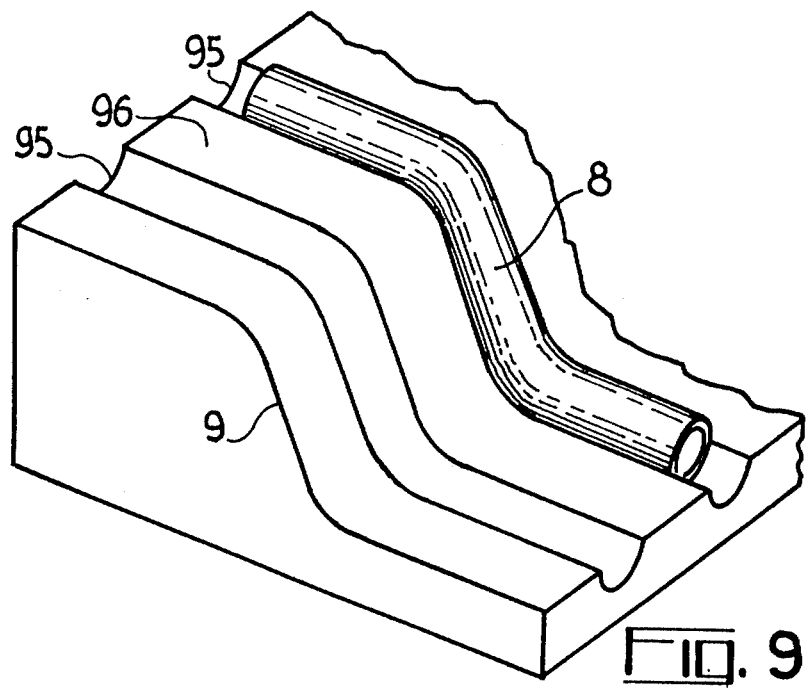
FIG. 9 shows a support according to the invention intended for the machining by abrasion of the coupling surfaces of the branching monofibres used in the embodiment illustrated in FIG. 6.

A support enabling the branching monofibres to be abraded over part of their length to prepare the coupling surface is shown in FIG. 9. This metallic support has a profile 9 which adopts the exact profile imparted to the monofibres by the device shown in FIG. 8. It comprises parallel grooves 95 of which the cross-section of the monofibres. The shaped monofibres are disposed in these grooves and fixed with pitch or any other adhesive substance. Those parts of the fibres which project from the flat part 96 are abraded by conventional optical polishing techniques, leaving in this region of the monofibres only that part which is situated inside the grooves 95.

Without departing from the scope of the invention, it is also possible, for forming the two coupled monofibres which form the base element of the brancher, to combine the two embodiments described above with one another.

In this case, the two branching monofibres, after having been deformed in accordance with the first embodiment of the invention to form a common, flat coupling surface, are abraded along this same surface until the thickness constituting the cladding has been completely eliminated. The two planes are then coupled in accordance with the second version either by means of a sealing compound or by flame welding to form a mixing monofibre in the coupling region.

FIG. 10 is a section through two branching monofibres, of which the cross-sections 210 and 211 are two complementary circular segments with unequal areas which are coupled by a common chord to form a circular section in the coupling region. Contrary to the two coupled sections shown in FIG. 2, the cladding is eliminated at the coupling interface.

The branching monofibres thus coupled may be substituted for the monofibres 21 and 22 in the structure illustrated in FIG. 1. The connecting monofibre 30, for which there is no longer any need, is thus eliminated, the two coupled monofibres penetrating directly into the ferrule 310.

What we claim is:

1. A brancher-mixer for distributing, in connections by bundles of optical fibres, the radiation emanating from a transmitting bundle between first and second receiving bundles, said brancher-mixer comprising:
   n inlet and first and second outlets for respectively receiving the orifices of the transmitting bundle of the first receiving bundle and of the second receiving bundles; and
   first and second branching monofibres for establishing the optical connection between said first inlet and respectively said first and second outlets; each said branching monofibres having an input and an output orifice and a common coupling surface over part of their length from said input orifices, said input orifices thereby being laterally coupled to receive said radiation;
   the cross section of each of said branching monofibres being non uniform and having a substantially constant area.

2. A brancher-mixer as claimed in claim 1, wherein the cross-section contour of said branching monofibres varies progressively from the circular segment in the vicinity of said input orifice to the circle in the vicinity of said output orifice; said circular segments being the two complementary segments of same circle and being coupled by their common chord.

3. A brancher-mixer as claimed in claim 1, wherein said branching monofibres remain equipped with their cladding at said coupling surface and which further comprises an input connecting monofibre disposed between said inlet and said laterally coupled input orifices of said branching monofibres.

4. A brancher-mixer as claimed in claim 3, wherein said laterally coupled input orifices of said branching monofibres have the same surface area and which further comprises displacement means for modifying the position of said input connecting monofibre opposite said laterally coupled input orifices of said branching monofibres.

5. A brancher-mixer as claimed in claim 3, which further comprises first and second connecting monofibres respectively disposed between said output orifice of said first branching monofibre and said first outlet and between said output orifice of said second branching monofibre and said second outlet.

* * * * *